United States Patent
Ge et al.

(10) Patent No.: US 11,043,896 B1
(45) Date of Patent: Jun. 22, 2021

(54) VOLTAGE REGULATOR WITH CLAMPED ADAPTIVE VOLTAGE POSITION AND CONTROL METHOD THEREOF

(71) Applicant: Monolithic Power Systems, Inc., San Jose, CA (US)

(72) Inventors: Ting Ge, San Jose, CA (US); Daocheng Huang, Santa Clara, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 16/721,228

(22) Filed: Dec. 19, 2019

(51) Int. Cl.
*H02M 3/156* (2006.01)

(52) U.S. Cl.
CPC .................................. *H02M 3/156* (2013.01)

(58) Field of Classification Search
CPC ...... H02M 3/155; H02M 3/156; H02M 3/157; H02M 3/158; H02M 3/1588; H02M 2001/0016; H02M 2001/0025
See application file for complete search history.

(56) References Cited

U.S. PATENT DOCUMENTS

| 9,800,145 | B2 * | 10/2017 | Sasaki | H02M 3/156 |
| 2002/0125871 | A1 * | 9/2002 | Groom | H02M 3/156 323/284 |

OTHER PUBLICATIONS

U.S. Appl. No. 16/389,892, filed Apr. 19, 2019, Chengdu Monolithic Power Systems Co., Ltd.
U.S. Appl. No. 15/938,936, filed Mar. 28, 2018, Monolithic Power System, Inc.
U.S. Appl. No. 16/367,179, filed Mar. 27, 2019, Monolithic Power System, Inc.

\* cited by examiner

*Primary Examiner* — Gary L Laxton
(74) *Attorney, Agent, or Firm* — Perkins Coie LLP

(57) ABSTRACT

A voltage regulator has a switching circuit and a control circuit. The switching circuit receives an input voltage and provides an output voltage and an output current. The control circuit provides a control signal to the switching circuit, such that the output voltage is maintained at a clamp voltage level when the output current is lower than a transition current level, and the output voltage decreases as the output current increases when the output current is higher than the transition current level.

16 Claims, 4 Drawing Sheets

US 11,043,896 B1

VOLTAGE REGULATOR WITH CLAMPED ADAPTIVE VOLTAGE POSITION AND CONTROL METHOD THEREOF

TECHNICAL FIELD

The present invention generally relates to electronic circuits, and more particularly, relates to voltage regulators with adaptive voltage position and control methods thereof.

BACKGROUND

For voltage regulators (VRs) used in electronic devices such as laptops, desktops and servers, adaptive voltage position (AVP) control is widely applied to reduce voltage spikes during transient period and achieve better dynamic voltage regulation. The basic idea of conventional AVP control is shown in FIG. 1. An output voltage Vo of a voltage regulator linearly decreases as an output current Io of the voltage regulator increases, while the output voltage Vo is regulated within a range between Vmax and Vmin. Vmax is a permitted maximum output voltage level, and Vmin is a permitted minimum output voltage level. In another word, the output voltage Vo is controlled so that it is slightly higher than Vmin at full load, and a litter lower than Vmax at light load. As a result, the entire voltage tolerance window can be used for the voltage jump or drop during transient period. AVP control allows use of fewer output capacitors, and reduces cost.

However, due to rapid development of electronic devices, new challenges and various requirements for AVP control appear. Under traditional AVP control, the output voltage Vo is dependent of the output current Io, while it is required that the output voltage Vo is maintained to be independent of the output current Io at light load in some scenarios. Accordingly, a new AVP control method and circuit thereof is needed.

SUMMARY

There has been provided, in accordance with an embodiment of the present invention, a voltage regulator comprising a switching circuit configured to receive an input voltage and to provide an output voltage and an output current; and a control circuit, configured to provide a control signal to the switching circuit, such that the output voltage is maintained at a clamp voltage level when the output current is lower than a transition current level, and the output voltage decreases as the output current increases when the output current is higher than the transition current level.

There has been provided, in accordance with an embodiment of the present invention, a control circuit used in a voltage regulator, wherein the voltage regulator has a switching circuit configured to receive an input voltage and to provide an output voltage and an output current, the control circuit configured to provide a control signal to the switching circuit, such that the output voltage is maintained at a clamp voltage level when the output current is lower than a transition current level, and the output voltage decreases as the output current increases when the output current is higher than the transition current level.

There has been provided, in accordance with an embodiment of the present invention, a voltage regulating method, comprising providing an output voltage and an output current in response to an input voltage; and regulating the output voltage such that the output voltage is maintained at a clamp voltage level when the output current is lower than a transition current level, and the output voltage decreases as the output current increases when the output current is higher than the transition current level.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
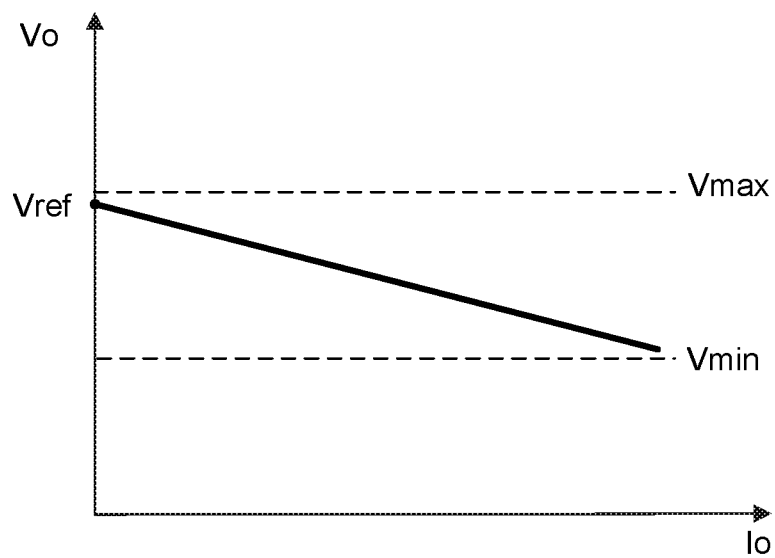
FIG. 1 illustrates the basic idea of conventional AVP control.
Figure 2:
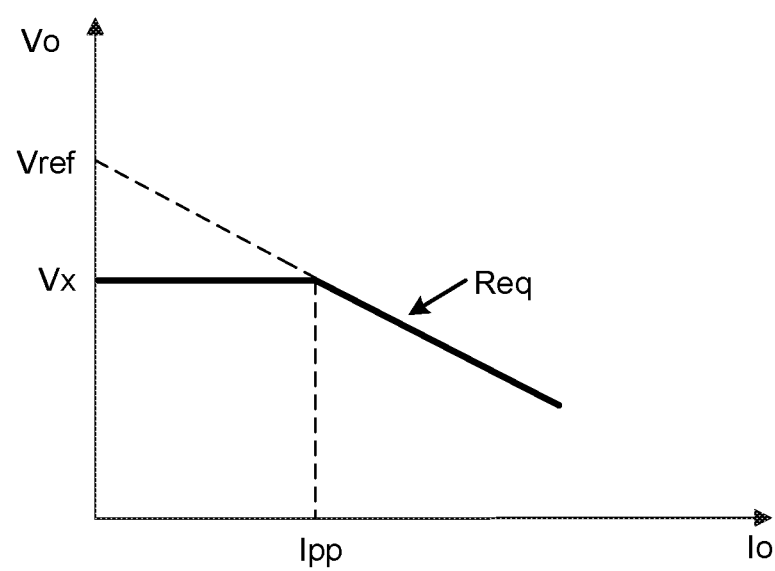
FIG. 2 schematically shows a load line of the output voltage Vo versus the output current Io of a voltage regulator in accordance with an embodiment of the present invention.

FIG. 2 schematically shows a load line of the output voltage Vo versus the output current Io of a voltage regulator in accordance with an embodiment of the present invention. In FIG. 2, a transition current level Ipp is a transition point of the load line. In the first piecewise curve, i.e. when the output current Io is lower than the transition current level Ipp, the output voltage Vo is maintained at a clamp voltage level Vx, being independent of the output current Io, so the relationship between the output voltage Vo and the output current Io in the first piecewise curve may be expressed as:

$$Vo = Vx \quad (1)$$

In the second piecewise curve, when the output current Io is higher than Ipp, the output voltage Vo linearly decrease as the output current Io increases, being the same with conventional AVP control, so the relationship between the output voltage Vo and the output current Io in the second piecewise curve may be expressed as:

$$Vo = Vref - Req \cdot Io \quad (2)$$

Where Vref is a reference voltage level, and Req is a slope of the second piecewise curve. In one embodiment, the reference voltage level Vref is determined via voltage identification code (VID) from a microprocessor. Persons of ordinary skill in the art should recognize that, if the reference voltage level Vref, the slope Req of the second piece wise curve, and the clamp voltage level Vx are determined, the transition current level Ipp is determined accordingly.

Figure 3:
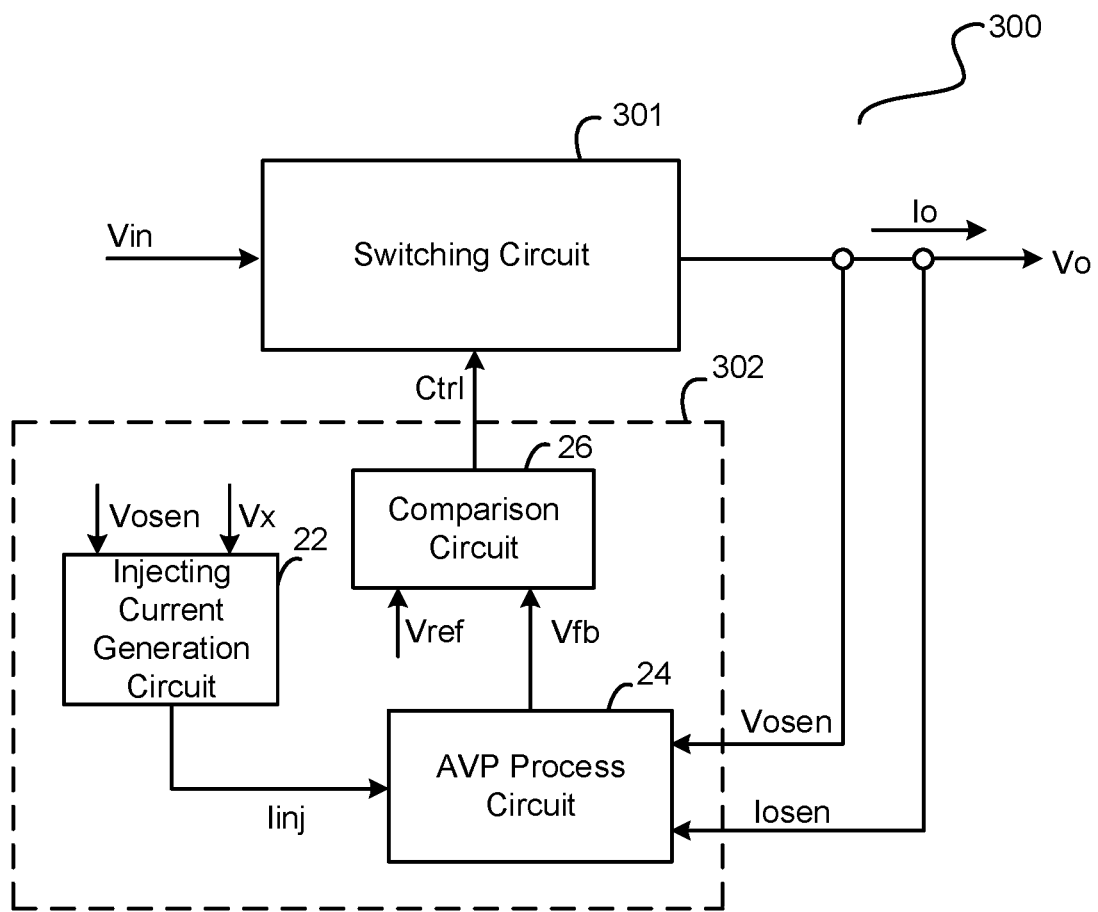
FIG. 3 shows a voltage regulator 300 in accordance with an embodiment of the present invention.

FIG. 3 shows a voltage regulator 300 in accordance with an embodiment of the present invention. In the example of FIG. 3, the voltage regulator 300 comprises a switching circuit 301, configured to receive an input voltage Vin and to provide the output voltage Vo and the output current Io; a control circuit 302, configured to provide a control signal Ctrl to the switching circuit 301, such that the output voltage Vo is maintained at the clamp voltage level Vx when the output current Io is lower than the transition current level Ipp, and the output voltage Vo decreases as the output current Io increases when the output current Io is higher than the transition current level Ipp. The clamp voltage level Vx may be set differently according to different requirements in real applications.

In the example of FIG. 3, the control circuit 302 comprises an injecting current generation circuit 22, configured to generate an injecting current Iinj based on an output voltage sensing signal Vosen indicative of the output voltage Vo, and the clamp voltage level Vx; an AVP process circuit 24, configured to receive the injecting current Iinj, the output voltage sensing signal Vosen and an output current sensing signal Iosen indicative of the output current Io, and to provide a feedback voltage Vfb; and a comparison circuit 26, configured to receive the feedback voltage Vfb and the reference voltage level Vref, and to provide the control signal Ctrl to the switching circuit 301.

Figure 4:
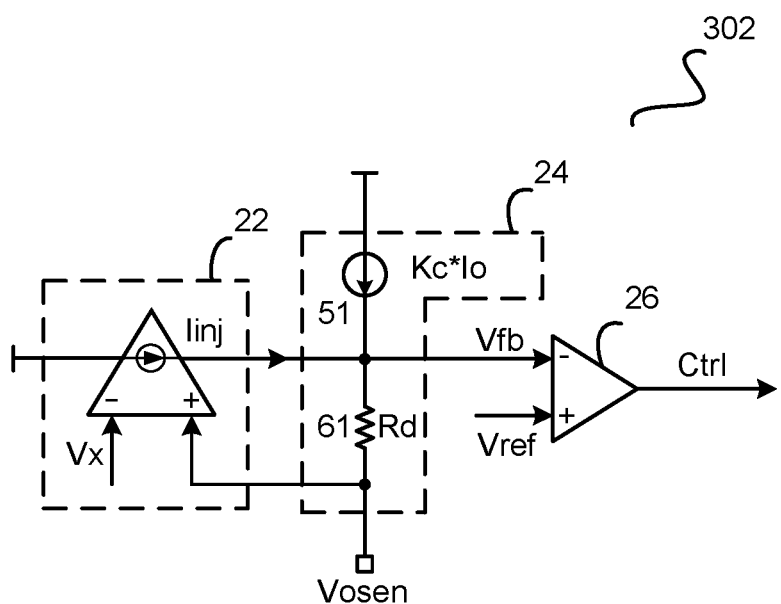
FIG. 4 schematically shows the control circuit 302 in accordance with an embodiment of the present invention.

FIG. 4 schematically shows the control circuit 302 in accordance with an embodiment of the present invention. In the example of FIG. 4, the current generation circuit 22 comprises a unidirectional voltage-controlled-current-source (VCCS), configured to receive the output voltage sensing signal Vosen and the clamp voltage level Vx, and to generate the injecting current Iinj, wherein the injecting current Iinj is in proportion to the differential between the output voltage sensing signal Vosen and the clamp voltage level Vx, and the relationship described above may be expressed as:

$$Iinj = Ag(Vosen - Vx) \quad (3)$$

Wherein Ag is a transconductance coefficient of the VCCS. In an example of the present invention, the output voltage sensing signal Vosen equals the output voltage Vo.

The AVP process circuit 24 comprises a current source 51, configured to provide a droop current having a current level Kc*Io based on the output current sensing signal Iosen (not shown here), wherein Kc is a current proportional coefficient; and a resistor 61 with a resistance Rd. The feedback voltage Vfb is provided at a node where the current source 51 is coupled to the resistor 61, so the feedback voltage Vfb may be expressed as:

$$Vfb = Vosen + Rd(Kc \cdot Io + Iinj) \quad (4)$$

As persons of ordinary skills in the art should know, the AVP process circuit 24 is typically applied in conventional AVP control, where a load line of the output voltage Vo versus the output current Io is linear and has a slope of Rd*Kc, i.e. the slope Req of the second piecewise curve in FIG. 2 equals Rd*Kc. The resistor 61 is referred to as a droop resistor, and a voltage across the resistor 61 is referred to as a droop voltage. To make it clearer, the droop voltage in the case of conventional AVP control is Rd*Kc*Io, while the droop voltage in the present invention is Rd(Kc*Io+Iinj). In another example of the present invention, the resistor 61 may be replaced with any other form of current-to-voltage converter. As long as the droop voltage in the present invention is generated across the current-to-voltage converter, and based on a sum of the injecting current Iinj and the droop current Kc*Io, the spirit of the invention is not distracted.

The comparison circuit 26 comprises a comparator, configured to receive the feedback voltage Vfb and the reference voltage level Vref, and to provide the control signal Ctrl based on the feedback voltage Vfb and the reference voltage level Vref. Namely, here is another equation expressed as:

$$Vfb = Vref \quad (5)$$

According to equation (2), the transition current level Ipp may be expressed as:

$$Ipp = (Vref - Vx)/Req = (Vref - Vx)/(Rd \cdot Kc) \quad (6)$$

According to equations (3)-(6), the injecting current Iinj may be expressed as:

$$Iinj = (Ipp - Io) \cdot Kc \cdot Rd/(1/Ag + Rd) \quad (7)$$

If the transconductance coefficient Ag is indefinite, then the injecting current Iinj may be rewritten as:

$$Iinj = Kc(Ipp - Io) \quad (8)$$

Plugging equation (8) into equation (4), the output voltage sensing signal Vosen may be rewritten as Vosen=Vref−Rd*(Kc*Io+Kc(Ipp−Io)), namely, Vosen=Vx. Since Vosen equals Vo, it will in fact be Vo=Vx. In another world, the injecting current generation circuit 22 generates the injecting current Iinj designed to help maintain the output voltage Vo as the clamp voltage level Vx.

It should be noted that, according to the unidirectional VCCS, and seen from equation (8), when the output current Io grows higher than the transition current level Ipp, the injecting current Iinj equals zero Hence, the output voltage Vo decreases with increase of the output current Io, as shown in the second piecewise curve in FIG. 2. In real practice, the transconductance coefficient Ag is designed to be large enough to achieve the object of the present invention. Namely, the transconductance coefficient Ag is designed to make sure that 1/Ag is much smaller than Rd. In an embodiment of the present invention, the transconductance coefficient Ag is designed such that 1/Ag is smaller than tenth of Rd.

Figure 5:
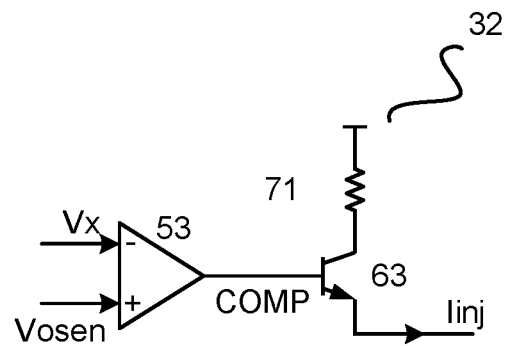
FIG. 5 schematically shows an injecting current generation circuit 32 in accordance with an embodiment of the present invention.

FIG. 5 schematically shows an injecting current generation circuit 32 in accordance with an embodiment of the present invention. In the example of FIG. 5, the injecting current generation circuit 32 comprises a comparator 53, configured to receive the clamp voltage level Vx and the output voltage sensing signal Vosen, and to provide a comparison signal COMP; a transistor 63, configured to receive the comparison signal COMP at a base electrode of the transistor 63, and to provide the injecting current Iinj at an emitter electrode of the transistor 63; a pull-up resistor 71, coupled to a voltage source and a collector electrode of the transistor 63. Since the transistor 63 is unidirectional, the injecting current Iinj provided at the emitter electrode will be zero when the output voltage Vo, i.e. the output voltage sensing signal Vosen is lower than the clamp voltage level Vx, namely when the output current Io is higher than the transition current level Ipp.

Figure 6:
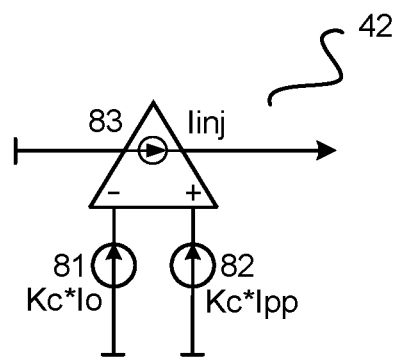
FIG. 6 schematically shows an injecting current generation circuit 42 in accordance with an embodiment of the present invention.

FIG. 6 schematically shows an injecting current generation circuit 42 in accordance with an embodiment of the present invention. As described above, once equation (8) is satisfied, the output voltage Vo will be maintained at the clamp voltage level Vx. So, in the example of FIG. 6, the injecting current generation circuit 42 comprises a current source 81, configured to provide a first current having a current level Kc*Io; a current source 82, configured to provide a second current having a current level Kc*Ipp; and a current-controlled-current-source (CCCS) 83, configured to receive the first current and the second current, and to provide the injecting current Iinj based on a differential between the current level Kc*Ipp and the current level Kc*Io.

Figure 7:
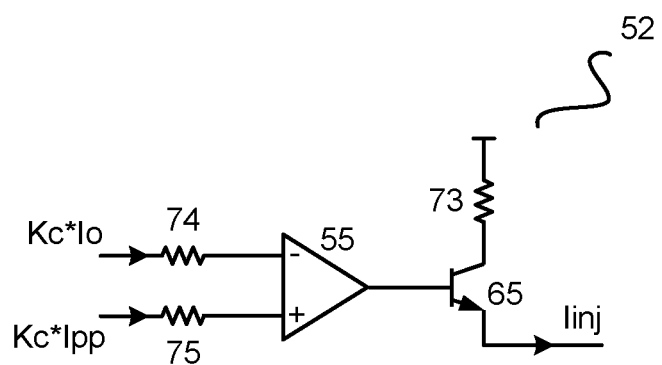
FIG. 7 schematically shows an injecting current generation circuit 52 in accordance with an embodiment of the present invention.

FIG. 7 schematically shows an injecting current generation circuit 52 in accordance with an embodiment of the present invention. Different from FIG. 5, a comparator 55 receives the first current through a resistor 74, and receives the second current through a resistor 75, wherein the resistor 74 and the resistor 75 have the same resistance.

In an embodiment of the present invention, the AVP process circuit 24 and the comparison circuit 26 are integrated on the same chip, while the injecting current generation circuit 22 is standalone outside the chip. In an embodiment of the present invention, the injecting current generation circuit 22, the AVP process circuit 24 and the comparison circuit 26 are all integrated on the same chip.

Figure 8:
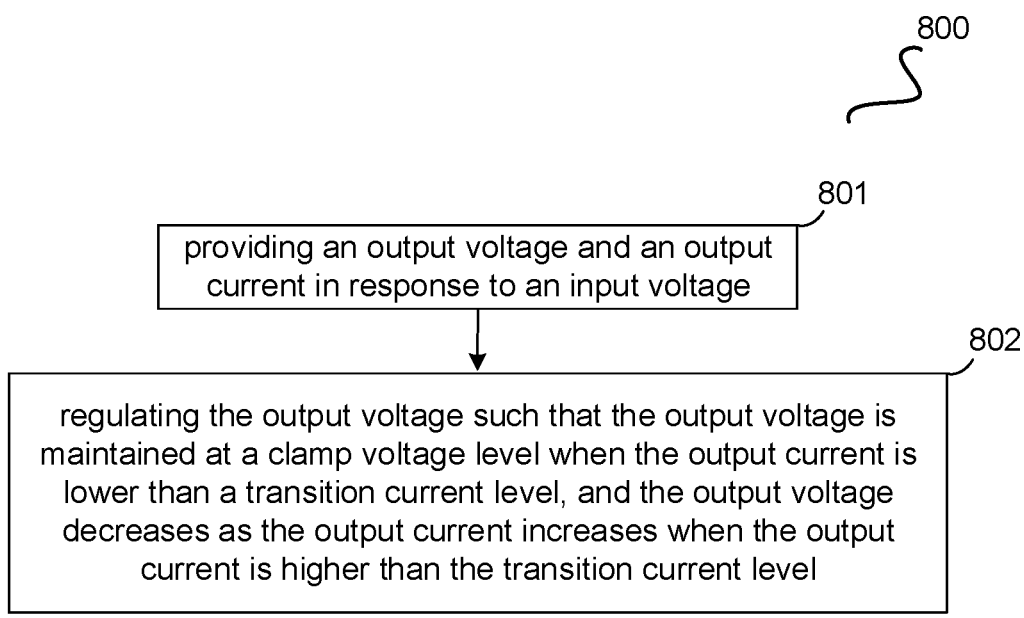
FIG. 8 shows a flow chart 800 of a voltage regulating method in accordance with an embodiment of the present invention.

FIG. 8 shows a flow chart 800 of a voltage regulating method in accordance with an embodiment of the present invention. The voltage regulating method comprising:

Step 801, providing an output voltage and an output current in response to an input voltage.

Step 802, regulating the output voltage such that the output voltage is maintained at a clamp voltage level when the output current is lower than a transition current level, and the output voltage decreases as the output current increases when the output current is higher than the transition current level.

In an embodiment of the present invention, the step 802 comprises: generating an injecting current, wherein, the injecting current is in proportion to a differential between the transition current level and the output current by a current proportional coefficient, and the injecting current is zero when the output current is higher than the transition current level; and generating a feedback voltage, wherein the feedback voltage is a sum of the output voltage and a droop voltage, and the droop voltage is generated based on a sum of the injecting current and a droop current in proportion to the output current by the current proportional coefficient.

In an embodiment of the present invention, the step 802 comprises: generating an injecting current, wherein, the injecting current is in proportion to a differential between the output voltage and the clamp voltage level by a transconductance coefficient designed to be large enough when the output current is lower than the transition current level, and the injecting current is zero when the output current is higher than the transition current level; and generating a feedback voltage, wherein the feedback voltage is a sum of the output voltage and a droop voltage, wherein the droop voltage is generated based on a sum of the injecting current and a droop current in proportion to the output current by a current proportion coefficient.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A voltage regulator, comprising:
   a switching circuit, configured to receive an input voltage and to provide an output voltage and an output current; and
   a control circuit, configured to provide a control signal to the switching circuit, such that the output voltage is maintained at a clamp voltage level when the output current is lower than a transition current level, and the output voltage decreases as the output current increases when the output current is higher than the transition current level; wherein
   the control circuit further comprises:
      an injecting current generation circuit, configured to generate an injecting current, wherein, the injecting current is in proportion to a differential between the transition current level and the output current by a current proportional coefficient when the output current is lower than the transition current level, and the injecting current is zero when the output current is higher than the transition current level;
      an AVP process circuit, configured to generate a feedback voltage, wherein the feedback voltage is a sum of the output voltage and a droop voltage, and the droop voltage is generated in proportion to a sum of the injecting current and a droop current by a resistance, wherein the droop current is in proportion to the output current by the current proportional coefficient; and
      a comparison circuit, configured to receive the feedback voltage and a reference voltage level, and to provide the control signal to the switching circuit.

2. The voltage regulator of claim 1, wherein the injecting current generation circuit comprises:
   a unidirectional voltage-controlled-current-source, configured to receive the clamp voltage level and an output voltage sensing signal indicative of the output voltage, and to generate the injecting current, wherein the injecting current is in proportion to a differential between the output voltage sensing signal and the clamp voltage level by a transconductance coefficient configured such that reciprocal of the transconductance coefficient is smaller than tenth of the resistance.

3. The voltage regulator of claim 1, wherein the injecting current generation circuit comprises:
   a comparator, configured to receive the clamp voltage level and an output voltage sensing signal indicative of the output voltage, and to provide a comparison signal based on the clamp voltage level and the output voltage sensing signal;

a transistor, configured to receive the comparison signal at a base electrode of the transistor, and to provide the injecting current at an emitter electrode of the transistor; and a pull-up resistor, coupled to a voltage source and a collector electrode of the transistor.

4. The voltage regulator of claim 1, wherein the injecting current generation circuit comprises:

a first current source, configured to provide a first current in proportion to the output current by the current proportional coefficient;

a second current source, configured to provide a second current in proportion to the transition current level by the current proportional coefficient; and a current-controlled-current-source, configured to receive the first current and the second current, and to provide the injecting current based on a differential between the first current and the second current.

5. The voltage regulator of claim 1, wherein the injecting current generation circuit comprises:

a comparator, configured to receive a first current in proportion to the output current by the current proportional coefficient through a first resistor, and a second current in proportion to the transition current level by the current proportional coefficient through a second resistor, and to provide a comparison signal based on the first current and the second current;

a transistor, configured to receive the comparison signal at a base electrode of the transistor, and to provide the injecting current at a emitter electrode of the transistor; and a pull-up resistor, coupled to a voltage source and a collector electrode of the transistor;

wherein, a resistance of the first resistor is the same with a resistance of the second resistor.

6. The voltage regulator of claim 1, wherein the AVP process circuit comprises:

a current source, configured to provide the droop current in proportion to the output current by the current proportional coefficient; and a current-to-voltage converter, configured to receive the injecting current and the droop current, and to generate the droop voltage based on the sum of the injecting current and the droop current, and to provide the feedback voltage.

7. A control circuit used in a voltage regulator, wherein the voltage regulator has a switching circuit configured to receive an input voltage and to provide an output voltage and an output current, the control circuit configured to provide a control signal to the switching circuit, such that:

the output voltage is maintained at a clamp voltage level when the output current is lower than a transition current level, and the output voltage decreases as the output current increases when the output current is higher than the transition current level; and the control circuit further comprising:

an injecting current generation circuit, configured to generate an injecting current, wherein, the injecting current is in proportion to a differential between the transition current level and the output current by a current proportional coefficient when the output current is lower than the transition current level, and the injecting current is zero when the output current is higher than the transition current level;

a AVP process circuit, configured to generate a feedback voltage, wherein the feedback voltage is a sum of the output voltage and a droop voltage, and the droop voltage is generated in proportion to a sum of the injecting current and a droop current by a resistance, wherein the droop current in proportion to the output current by the current proportional coefficient; and a comparison circuit, configured to receive the feedback voltage and a reference voltage level, and to provide the control signal to the switching circuit.

8. The control circuit of claim 7, wherein the injecting current generation circuit comprises:

a unidirectional voltage-controlled-current-source, configured to receive the clamp voltage level and an output voltage sensing signal indicative of the output voltage, and to generate the injecting current, wherein the injecting current is in proportion to a differential between the output voltage sensing signal and the clamp voltage level by a transconductance coefficient configured such that reciprocal of the transconductance coefficient is smaller than tenth of the resistance.

9. The control circuit of claim 7, wherein the injecting current generation circuit comprises:

a comparator, configured to receive the clamp voltage level and an output voltage sensing signal indicative of the output voltage, and to provide a comparison signal based on the clamp voltage level and the output voltage sensing signal;

a transistor, configured to receive the comparison signal at a base electrode of the transistor, and to provide the injecting current at an emitter electrode of the transistor; and a pull-up resistor, coupled to a voltage source and a collector electrode of the transistor.

10. The control circuit of claim 7, wherein the injecting current generation circuit comprises:

a first current source, configured to provide a first current in proportion to the output current by the current proportional coefficient;

a second current source, configured to provide a second current in proportion to the transition current level by the current proportional coefficient; and a current-controlled-current-source, configured to receive the first current and the second current, and to provide the injecting current based on a differential between the first current and the second current.

11. The control circuit of claim 7, wherein the injecting current generation circuit comprises:

a comparator, configured to receive a first current in proportion to the output current by the current proportional coefficient through a first resistor, and a second current in proportion to the transition current level by the current proportional coefficient through a second resistor, and to provide a comparison signal based on the first current and the second current;

a transistor, configured to receive the comparison signal at a base electrode of the transistor, and to provide the injecting current at an emitter electrode of the transistor; and a pull-up resistor, coupled to a voltage source and a collector electrode of the transistor;

wherein, a resistance of the first resistor is the same with a resistance of the second resistor.

12. The voltage regulator of claim 7, wherein the AVP process circuit comprises:

a current source, configured to provide the droop current in proportion to the output current by the current proportional coefficient; and a current-to-voltage converter, configured to receive the injecting current and the droop current, and to generate the droop voltage based on the sum of the injecting current and the droop current, and to provide the feedback voltage.

13. The control circuit of claim 7, wherein the AVP process circuit and the comparison circuit are integrated on the same chip, while the injecting current generation circuit is standalone outside the chip.

14. The control circuit of claim 7, wherein the injecting current generation circuit, the AVP process circuit and the comparison circuit are integrated on a same chip.

15. A voltage regulating method, comprising:
providing an output voltage and an output current in response to an input voltage; and
regulating the output voltage such that the output voltage is maintained at a clamp voltage level when the output current is lower than a transition current level, and the output voltage decreases as the output current increases when the output current is higher than the transition current level; wherein
regulating the output voltage further comprises:
generating an injecting current, wherein, the injecting current is in proportion to a differential between the transition current level and the output current by a current proportional coefficient when the output current is lower than the transition current level, and the injecting current is zero when the output current is higher than the transition current level; and
generating a feedback voltage, wherein the feedback voltage is a sum of the output voltage and a droop voltage, and the droop voltage is generated in proportion to a sum of the injecting current and a droop current by a resistance, wherein the droop current is in proportion to the output current by the current proportion coefficient.

16. A voltage regulating method, comprising:
providing an output voltage and an output current in response to an input voltage; and
regulating the output voltage such that the output voltage is maintained at a clamp voltage level when the output current is lower than a transition current level, and the output voltage decreases as the output current increases when the output current is higher than the transition current level; wherein
regulating the output voltage further comprises:
generating an injecting current, wherein, the injecting current is in proportion to a differential between the output voltage and the clamp voltage level by a transconductance coefficient, when the output current is lower than the transition current level, and the injecting current is zero when the output current is higher than the transition current level; and
generating a feedback voltage, wherein the feedback voltage is a sum of the output voltage and a droop voltage, and the droop voltage is generated in proportion to a sum of the injecting current and a droop current by a resistance, wherein the droop current is in proportion to the output current by a current proportion coefficient;
wherein, the transconductance coefficient is configured such that reciprocal of the transconductance coefficient is smaller than tenth of the resistance.

* * * * *